United States Patent
Ohtsu (10) Patent No.: US 8,577,569 B2
(45) Date of Patent: Nov. 5, 2013

(54) VEHICLE CONTROL APPARATUS

(75) Inventor: Nobuyuki Ohtsu, Isehara (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 489 days.

(21) Appl. No.: 12/879,317

(22) Filed: Sep. 10, 2010

(65) Prior Publication Data

US 2011/0066341 A1    Mar. 17, 2011

(30) Foreign Application Priority Data

Sep. 17, 2009  (JP) .................................. 2009-215499

(51) Int. Cl.
  *F16H 61/02*  (2006.01)
(52) U.S. Cl.
  USPC ................................. 701/65; 701/83; 701/84
(58) Field of Classification Search
  USPC ................. 701/78, 79, 80, 83, 84, 81, 91, 65; 303/143, 113.2
  See application file for complete search history.

(56) References Cited

U.S. PATENT DOCUMENTS

| | | | |
|---|---|---|---|
| 5,117,934 A * | 6/1992 | Tsuyama et al. | 180/197 |
| 6,125,319 A * | 9/2000 | Hac et al. | 701/80 |
| 8,380,417 B2 * | 2/2013 | Kaster | 701/83 |
| 2004/0026991 A1 * | 2/2004 | Suzuki et al. | 303/113.2 |

FOREIGN PATENT DOCUMENTS

JP    9-175225    7/1997

* cited by examiner

*Primary Examiner* — Richard Camby
(74) *Attorney, Agent, or Firm* — Antonelli, Terry, Stout & Kraus, LLP.

(57) ABSTRACT

A vehicle control apparatus includes a bad-road control-mode switch configured to be manipulated by a driver, and a bad-road control section configured to perform a bad-road control when a bad-road control mode is selected by the bad-road control-mode switch. The bad-road control section includes a braking-force applying section configured to apply a braking force to a drive-wheel, and a driving-force applying section configured to apply a driving force to the drive-wheel which is receiving the braking force from the braking-force applying section, as the bad-road control.

6 Claims, 6 Drawing Sheets

GAP BECOMES DEEPER DUE TO FREE ROTATION TO MAKE ESCAPE DIFFICULT

VEHICLE ESCAPES AT FIRST-TIME ROTATION BY SUPPRESSING SLIP BY MEANS OF ADJUSTMENT OF BRAKE AND DRIVING TORQUE

VEHICLE CONTROL APPARATUS

BACKGROUND OF THE INVENTION

The present invention relates to a control apparatus for a vehicle.

Japanese Patent Application Publication No. 9-175225 discloses a previously-proposed technique in the field. In this technique, it is determined that a vehicle is being stuck, when a state where a speed of the vehicle is lower than a threshold value has continued for a predetermined time duration under a depressed state of accelerator pedal. When the vehicle is being stuck, a driving force according to an accelerator-pedal position is generated in a forward-running direction if the vehicle speed is higher than or equal to 0. On the other hand, if the vehicle speed is lower than 0, the driving force is set to 0. These operations for driving force are repeated in order to escape from the stuck state.

SUMMARY OF THE INVENTION

However, in the above-mentioned technique, there is a risk that a gap (pothole) of road surface is dug more deeply until it is determined that the vehicle is in the stuck state, so that the escape from the stuck state becomes more difficult.

It is therefore an object of the present invention to provide a vehicle control apparatus devised to make it easy to escape from the stuck state.

According to one aspect of the present invention, there is provided a vehicle control apparatus comprising: a bad-road control-mode switch configured to be manipulated by a driver; and a bad-road control section configured to perform a bad-road control when a bad-road control mode is selected by the bad-road control-mode switch, the bad-road control section including a braking-force applying section configured to apply a braking force to a drive-wheel, and a driving-force applying section configured to apply a driving force to the drive-wheel which is receiving the braking force from the braking-force applying section, as the bad-road control.

According to another aspect of the present invention, there is provided a vehicle control apparatus comprising: a bad-road control-mode switch configured to be manipulated by a driver; and a bad-road control section configured to perform a bad-road control when a bad-road control mode is selected by the bad-road control-mode switch, the bad-road control section including a shift changeover function configured to automatically change a shift state of vehicle between a forward running and a reverse running, and a driving-force applying section configured to reduce a driving force acting on a road-wheel when the shift state of vehicle is changed by the shift changeover function, and configured to apply a predetermined driving force to the road-wheel when a predetermined time has elapsed after the change of shift state, as the bad-road control.

According to still another aspect of the present invention, there is provided a vehicle control apparatus comprising: a bad-road control-mode switch configured to be manipulated by a driver; and a bad-road control section configured to perform a bad-road control when a bad-road control mode is selected by the bad-road control-mode switch, the bad-road control section including a braking-force applying section configured to apply a braking force to a drive-wheel, a driving-force applying section configured to apply a driving force to the drive-wheel which is receiving the braking force from the braking-force applying section as the bad-road control, and a shift changeover function configured to automatically change a shift state of vehicle between a forward running and a reverse running, as the bad-road control.

The other objects and features of this invention will become understood from the following description with reference to the accompanying drawings.

BRIEF DESCRIPTION OF DRAWINGS

FIGS. 4A and 4B are views showing a stuck state where the vehicle is being caught into a gap formed in a road surface.

FIGS. 5A and 5B are views showing a scene where the vehicle escapes from its stuck state, in the first embodiment.

FIGS. 7A and 7B are views showing a scene where the vehicle escapes from its stuck state, in the second embodiment.

DETAILED DESCRIPTION OF THE INVENTION

[First Embodiment]
[Schematic Structure]

Figure 1:
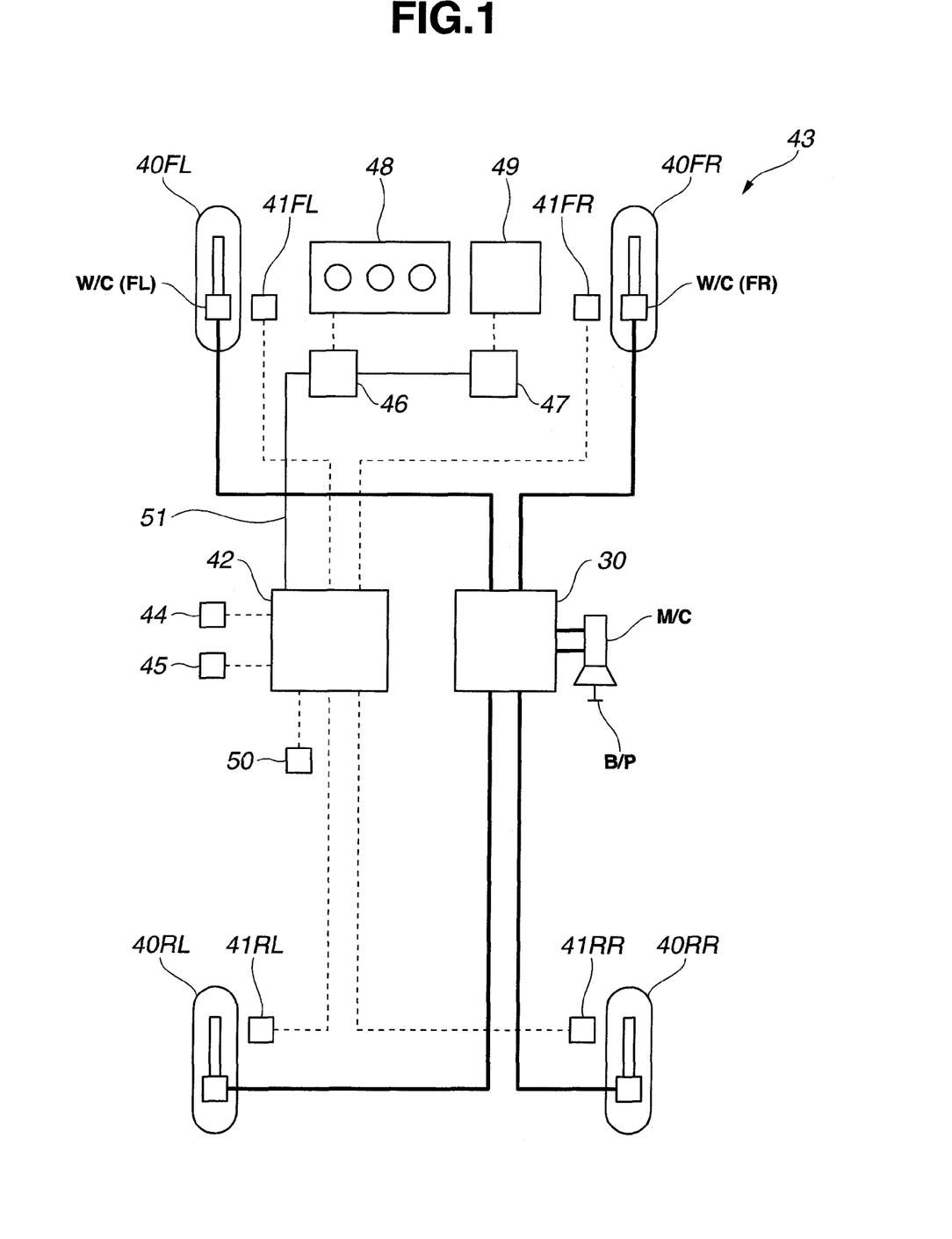
FIG. 1 is a schematic structural diagram of vehicle in a first embodiment according to the present invention.

FIG. 1 is a schematic structural diagram showing a vehicle 43. As a brake system, the vehicle 43 includes a brake pedal B/P, a mater cylinder M/C, a hydraulic control unit 30 for controlling fluid pressures, and wheel cylinders W/C(FL), W/C(FR), W/C(RL) and W/C(RR). A depressing force (pedal-depressing force) of driver is inputted to the brake pedal B/P. The master cylinder M/C functions to generate fluid pressure according to the depressing force inputted to the brake pedal B/P. Each of the wheel cylinders W/C(FL), W/C(FR), W/C(RL) and W/C(RR) functions to apply braking force to corresponding road wheel 40FL, 40FR, 40RL or 40RR. As a control system such as controller, the vehicle 43 includes road-wheel speed sensors 41FL, 41FR, 41RL and 41RR, a steering angle sensor 44, a combined sensor 45, an automatic vehicle-start switch 50, a brake controller 42, an engine controller 46, and a motor controller 47. Each of the road-wheel speed sensors 41FL, 41FR, 41RL and 41RR functions to detect a speed of the corresponding road wheel 40FL, 40FR, 40RL or 40RR. The steering angle sensor 44 functions to detect a steering angle of a steering wheel. The combined sensor 45 functions to detect a front-rear(-directional) acceleration value and a yaw rate. The automatic vehicle-start switch 50 functions to activate a control for automatically starting the vehicle 43 irrespective of manipulations of the driver, for example, at the time of running on a sandy place. The brake controller 42 controls the hydraulic control unit 30. The engine controller 46 controls an engine 48. The motor controller 47 controls a motor 49. The brake controller 42 receives information derived from the road-wheel speed sensors 41FL, 41FR, 41RL and 41RR, the steering angle sensor 44, the combined sensor 45 and the automatic vehicle-start switch 50. The brake controller 42, the engine controller 46 and the motor controller 47 are connected with one another by Controller Area Network communication (hereinafter referred to as, CAN communication) 51 so that information is shared by these brake controller 42, engine controller 46 and motor controller 47.

[Structure of Brake Hydraulic Circuit]

Figure 2:
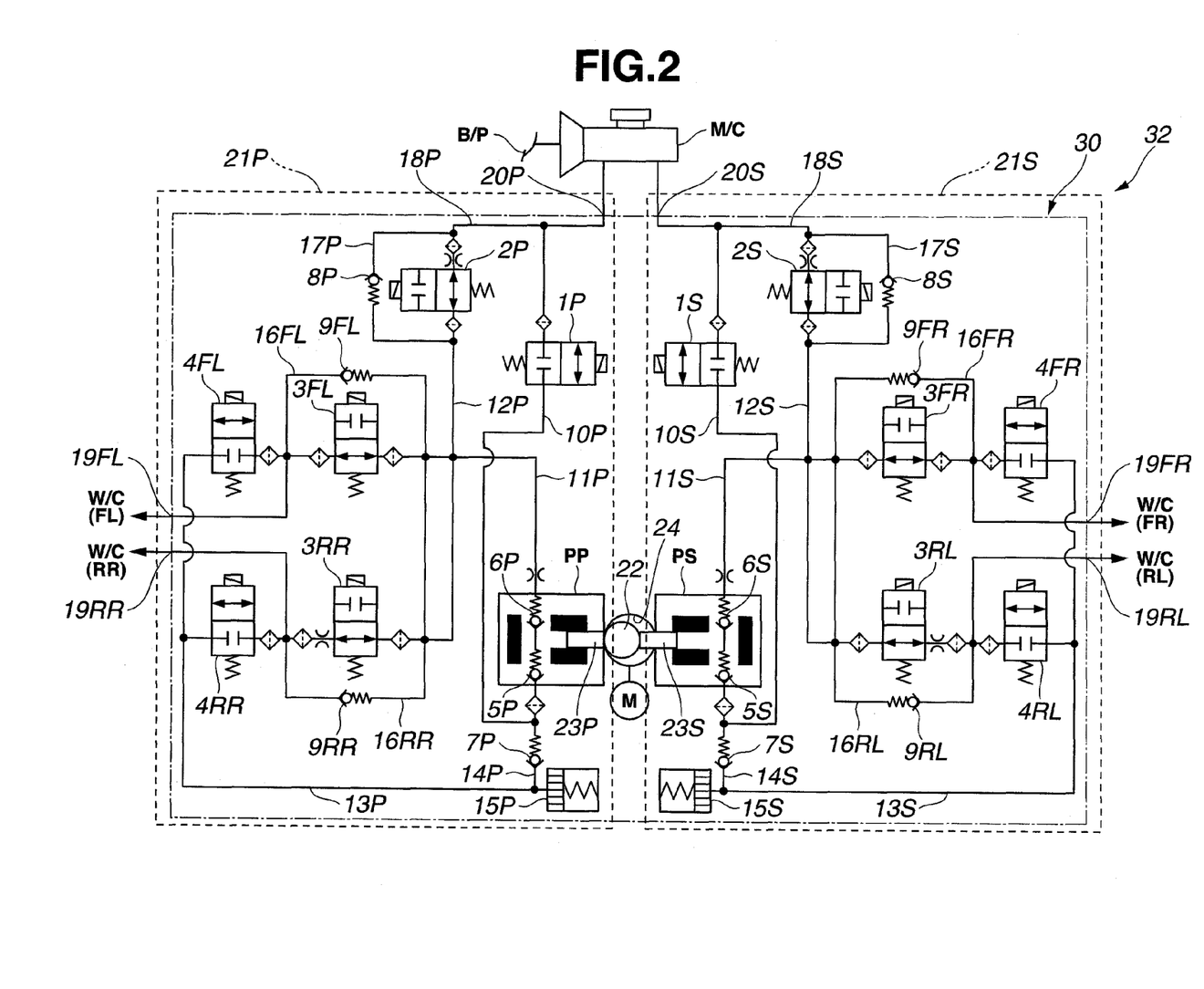
FIG. 2 is a hydraulic circuit diagram of a brake hydraulic control unit in the first embodiment.

FIG. 2 is a hydraulic circuit diagram of a brake hydraulic control unit 32. The hydraulic circuits are formed in the hydraulic control unit 30 provided between the master cylinder M/C and the wheel cylinders W/C. This brake hydraulic control unit 32 performs a fluid-pressure control according to a request fluid pressure of Vehicle Dynamics Control (hereinafter referred to as, VDC), Anti-lock Brake System (hereinafter referred to as, ABS) and the like derived from the controller. The brake hydraulic control unit 32 is provided to construct a diagonal split layout of brake circuit having two pipe lines of a P-line and an S-line, that is sometimes termed "X-split piping". That is, the brake hydraulic control unit 32 includes a brake hydraulic circuit 21P as the P-line and a brake hydraulic circuit 21S as the S-line. The P-line (brake hydraulic circuit 21P) is connected with the wheel cylinders W/C(FL) for front-left wheel and the wheel cylinder W/C (RR) for rear right wheel. The S-line (brake hydraulic circuit 21S) is connected with the wheel cylinders W/C(FR) for front-right wheel and the wheel cylinder W/C(RL) for rear left wheel.

Moreover, plunger pump PP is provided to the P-line (brake hydraulic circuit 21P), and a plunger pump PS is provided to the S-line (brake hydraulic circuit 21S). These plunger pumps PP and PS produce fluid pressures by reciprocating plungers 23P and 23S. The plungers 23P and 23S are reciprocated when a motor M drives a cam 22 eccentrically attached to a rotating shaft of the motor M inside a cam chamber 24.

An oil passage (hydraulic passage) 18P is connected through an oil passage 10P with a suction side of the plunger pump PP. In the same manner, an oil passage 18S is connected through an oil passage 10S with a suction side of the plunger pump PS. A gate in-valve 1P which is a normally-closed type solenoid valve is provided on the oil passage 10P, namely so as to cut across the oil passage 10P. In the same manner, on the oil passage 10S, a gate in-valve 1S which is a normally-closed type solenoid valve is provided. Moreover, a check valve 5P is provided between the gate in-valve 1P and the plunger pump PP on the oil passage 10P, namely so as to cut across the oil passage 10P. In the same manner, a check valve 5S is provided between the gate in-valve 1S and the plunger pump PS on the oil passage 10S. Each of the check valves 5P and 5S permits a flow of brake fluid in a direction toward the plunger pump PP or PS from the gate in-valve 1P or 1S, and prohibits a flow in the counter direction.

The wheel cylinders W/C(FL) and W/C(RR) are connected through an oil passage 11P with a discharge side of the plunger pump PP. In the same manner, the wheel cylinders W/C(FR) and W/C(RL) are connected through an oil passage 11S with a discharge side of the plunger pump PS. Booster valves (pressure increasing valves) 3FL and 3RR which are normally-open type solenoid valves corresponding to the wheel cylinders W/C(FL) and W/C(RR) are provided on the oil passage 11P, namely so as to cut across the oil passage 11P. In the same manner, booster valves (pressure increasing valves) 3FR and 3RL which are normally-open type solenoid valves corresponding to the wheel cylinders W/C(FR) and W/C(RL) are provided on the oil passage 11S. A check valve 6P is provided between the plunger pump PP and the booster valves 3FL and 3RR on the oil passage 11P, namely so as to cut across the oil passage 11P. In the same manner, a check valve 6S is provided between the plunger pump PS and the booster valves 3FR and 3RL on the oil passage 11S. The check valve 6P permits a flow of brake fluid in a direction toward the booster valves 3FL and 3RR from the plunger pump PP, and prohibits a flow in the counter direction. In the same manner, the check valve 6S permits a flow of brake fluid in a direction toward the booster valves 3FR and 3RL from the plunger pump PS, and prohibits a flow in the counter direction.

On the oil passage 11P, oil passages 16FL and 16RR are provided so as to make a detour around the booster valves 3FL and 3RR, respectively. In the same manner, on the oil passage 11S, oil passages 16FR and 16RL are provided so as to make a detour around the booster valves 3FR and 3RL, respectively. Check valves 9FL and 9RR are respectively provided on the oil passages 16FL and 16RR, namely to cut across the oil passages 16FL and 16RR. In the same manner, check valves 9FR and 9RL are respectively provided on the oil passages 16FR and 16RL, namely, to cut across the oil passages 16FR and 16RL. Each of the check valves 9FL, 9RR, 9FR and 9RL permits a flow of brake fluid in a direction toward the plunger pump PP or PS from the wheel cylinder W/C(FL), W/C(RR), W/C(FR) or W/C(RL), and prohibits a flow in the counter direction.

The master cylinder M/C is connected through an oil passage 12P with the oil passage 11P. The oil passage 11P and the oil passage 12P are merged with each other (connected with each other) at a point between the plunger pump PP and the booster valves 3FL and 3RR. In the same manner, the master cylinder M/C is connected through an oil passage 12S with the oil passage 11S. The oil passage 11S and the oil passage 12S are merged with each other at a point between the plunger pump PS and the booster valves 3FR and 3RL. Moreover, a gate out-valve 2P which is a normally-open type solenoid valve is provided on the oil passage 12P, namely so as to cut across the oil passage 12P. In the same manner, a gate out-valve 2S which is a normally-open type solenoid valve is provided on the oil passage 12S, namely so as to cut across the oil passage 12S. On the oil passage 12P, an oil passage 17P is so provided so as to make a detour around the gate out-valve 2P. In the same manner, on the oil passage 12S, an oil passage 17S is provided to make a detour around the gate out-valve 2S. On the oil passages 17P and 17S, check valves 8P and 8S are respectively provided. Each of these check valves 8P and 8S permits a flow of brake fluid in a direction toward the wheel cylinder W/C(FL), W/C(RR), W/C(FR) or W/C(RL) from the master cylinder M/C, and prohibits a flow in the counter direction.

A reservoir 15P is provided on the suction side of plunger pump PP and is connected through an oil passage 14P with the plunger pump PP. In the same manner, a reservoir 15S is provided on the suction side of plunger pump PS and is connected through an oil passage 14S with the plunger pump PS. A check valve 7P is provided between the reservoir 15P and the plunger pump PP, and a check valve 7S is provided between the reservoir 15S and the plunger pump PS. Each of these check valves 7P and 7S permits a flow of brake fluid in a direction toward the plunger pump PP or PS from the reservoir 15P or 15S, and prohibits a flow in the counter direction. The wheel cylinders W/C(FL) and W/C(RR) are connected through an oil passage 13P with the oil passage 14P, and the wheel cylinders W/C(FR) and W/C(RL) are connected through an oil passage 13S with the oil passage 14S. The oil passage 13P and the oil passage 14P are merged (connected) with each other at a location between the check valve 7P and the reservoir 15P. In the same manner, the oil passage 13S and the oil passage 14S are merged with each other at a location between the check valve 7S and the reservoir 15S. Pressure reducing valves 4FL and 4RR which are normally-closed type solenoid valves are provided on the oil passage 13P, namely so as to cut across the oil passage 13P. In the same manner, pressure reducing valves 4FR and 4RL which are normally-closed type solenoid valves are provided on the oil passage 13S, namely, so as to cut across the oil passage 13S.

[Automatic Escape Control Process]

Figure 3:
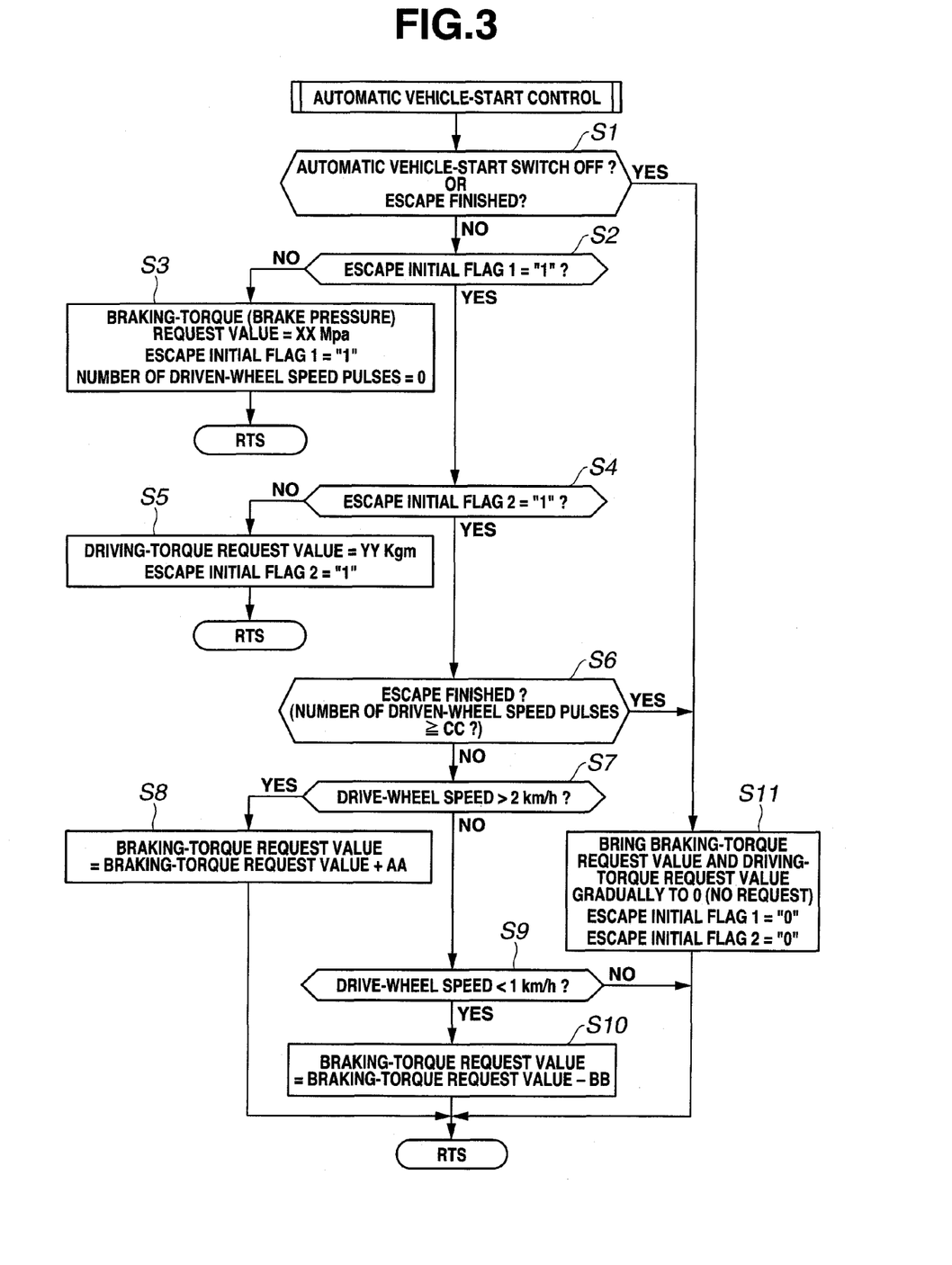
FIG. 3 is a flowchart showing a processing flow of an automatic escape control in the first embodiment.

FIG. 3 is a flowchart showing a processing flow of an automatic escape control (automatic vehicle-start control) for escaping from a bad road (e.g., sandy place, gap, hole, mud), which is performed by the brake controller 42, the engine controller 46 and the motor controller 47. At step S1, the controller (the brake controller 42, the engine controller 46 or the motor controller 47) judges whether or not the automatic vehicle-start switch 50 is in OFF status. Moreover, at step S1, the controller judges whether or not an escape of the vehicle has ended. If at least one of these two judgments is YES at step S1, namely if the automatic vehicle-start switch 50 is in OFF status or the escape of vehicle has ended; the program proceeds to step S11. If both of these two judgments are NO at step S1, namely if the automatic vehicle-start switch 50 is in an ON status and the escape of vehicle has not yet ended; the program proceeds to step S2. At step S2, the controller judges whether or not an escape initial flag 1 is in "1" status. If NO at step S2, namely if the escape initial flag 1 is not in "1" status; the program proceeds to step S3. If YES at step S2, namely if the escape initial flag 1 is in "1" status; the program proceeds to step S4. At step S3, the controller sets a braking-torque request value at XX [Mpa], sets the escape initial flag 1 at "1" status, and sets the number of driven-wheel speed pulses at 0. Then, the program returns to step S1. This driven-wheel speed pulse is a signal that is outputted from the road-wheel speed sensor 41. When a variation amount of the number of driven-wheel speed pulses is equal to 1, it means that the corresponding road wheel 40 has moved by approximately 5 [cm]. At step S4, the controller judges whether or not an escape initial flag 2 is in "1" status. If NO at step S4, namely if the escape initial flag 2 is not in "1" status, the program proceeds to step S5. If YES at step S4, namely if the escape initial flag 2 is in "1" status, the program proceeds to step S6. At step S5, the controller sets a driving-torque request value at YY [kgm], sets the escape initial flag 2 at "1" status, and sets the number of driven-wheel speed pulses at 0. Then, the program returns to step S1. The braking-torque request value XX [Mpa] of step S3 and the driving-torque request value YY [kgm] of step S5 are values which are set to prevent a slip of wheel 40 under a stuck state of the vehicle. These values XX [Mpa] and YY [kgm] are calculated through experiments or the like.

At step S6, the controller judges whether or not the escape of vehicle has ended. If YES at step S6, namely if the escape has already ended; the program proceeds to step S11. If NO at step S6, namely if the escape has not yet ended; the program proceeds to step S7. The controller can judge whether or not the escape has ended, by judging whether or not the number of driven-wheel speed pulses is larger than or equal to a predetermined value CC. This predetermined value CC means that the wheel 40 has moved approximately 1 [m]. At step S7, the controller judges whether or not a speed of drive wheel(s) is higher than 2 [km/h]. If YES at step S7, namely if the speed of drive wheel is higher than 2 [km/h]; the program proceeds to step S8. If NO at step S7, namely if the speed of drive wheel is lower than or equal to 2 [km/h]; the program proceeds to step S9. At step S8, the controller sets a current-time-around braking-torque request value (the braking-torque request value during a current control period) by adding a value AA [Mpa] to a last-time-around braking-torque request value (the braking-torque request value calculated during a previous control period). Then, the program returns to step S1. This predetermined torque value AA [Mpa] is provided for adjusting the speed of drive wheel to a level higher than or equal to 1 [km/h] and also lower than or equal to 2 [km/h]. The predetermined torque value AA [Mpa] is calculated through experiments or the like. At step S9, the controller judges whether or not the speed of drive wheel is lower than 1 [km/h]. If YES at step S9, namely if the speed of drive wheel is lower than 1 [km/h]; the program proceeds to step S10. If NO at step S9, namely if the speed of drive wheel is higher than or equal to 1 [km/h]; the program returns to step S1. At step S10, the controller sets the current-time-around braking-torque request value (the braking-torque request value during the current control period) by subtracting a value BB [Mpa] from the last-time-around braking-torque request value (the braking-torque request value calculated during the last-time-around control period). Then, the program returns to step S1. This predetermined torque value BB [Mpa] is provided for adjusting the speed of drive wheel to a level higher than or equal to 1 [km/h] and also lower than or equal to 2 [km/h]. The predetermined torque value BB [Mpa] is calculated through experiments or the like. At step S11, the controller sets the braking-torque request value so as to bring the braking-torque request value gradually to 0 [Mpa]. Also, the controller sets the driving-torque request value so as to bring the driving-torque request value gradually to 0 [kgm]. Moreover, at step S11, the controller resets (clears) the escape initial flag 1 and the escape initial flag 2. After the processing of step S11, the program returns to step S1. Although the braking-torque request value and the driving-torque request value are brought gradually to 0 at step S11, as another example, the braking-torque request value may be set at a predetermined value so that the vehicle is stopped.

[Operations]

Figure 4A:
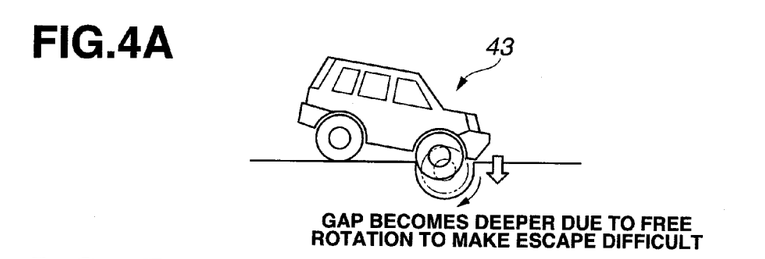
FIG. 4A is a schematic view showing the stuck state of vehicle.
Figure 4B:
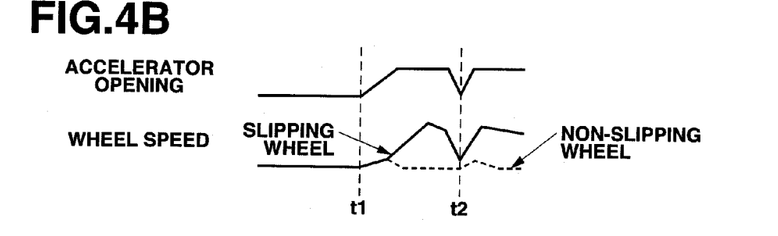
FIG. 4B is time charts of an accelerator opening and a wheel speed.

FIGS. 4A and 4B are views showing a stuck state where the vehicle 43 is being caught into a gap (hole) formed in a road surface. FIG. 4A is a schematic view showing the stuck state of vehicle 43. FIG. 4B is time charts of accelerator opening and road-wheel speed. At a time point t1, the driver depresses an accelerator pedal in order to escape from (get out of) the stuck state. At this time, the drive wheel which has been stuck in the gap rotates free (becomes in a free wheeling state, i.e., slipping state). At a time point t2, the driver again depresses the accelerator pedal in order to escape from the stuck state. Also at this time, the drive wheel which has been stuck in the gap rotates free. There is a technique in which it is determined that the vehicle 43 is in the stuck state when a speed of vehicle 43 is approximately equal to 0 even though the accelerator pedal is being depressed. However, in this technique, there is a risk that the gap is further dug or scraped due to the free rotation of drive wheel until it is determined that the vehicle 43 is in the stuck state. Thereby, the gap might become deeper so that the escape of the vehicle 43 becomes more difficult.

Figure 5A:
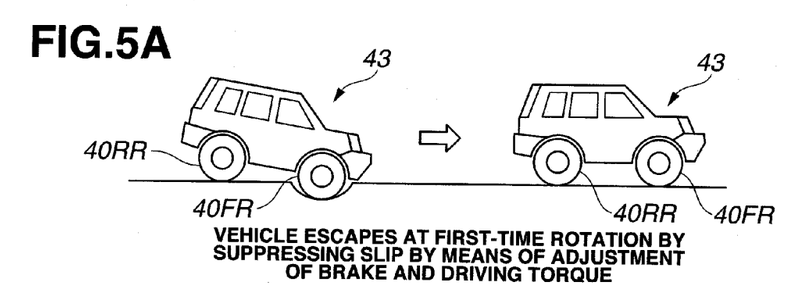
FIG. 5A is a schematic view showing the stuck vehicle.
Figure 5B:
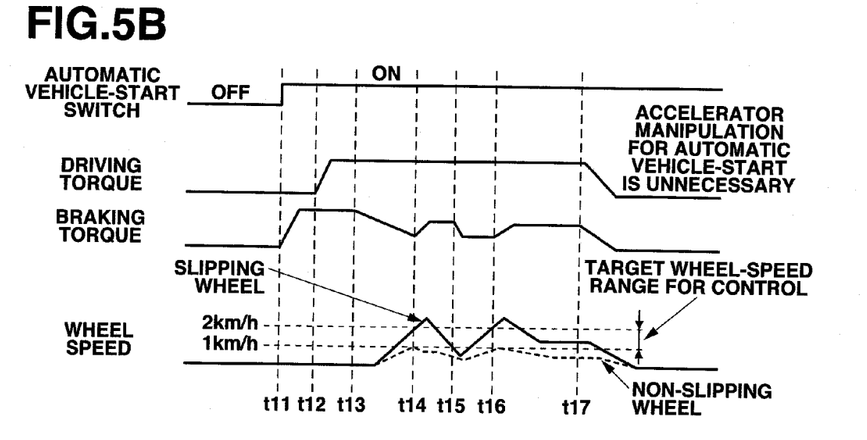
FIG. 5B is time charts of an automatic vehicle-start switch, a driving torque, a braking torque and a wheel speed.

Therefore, in the first embodiment according to the present invention; the automatic vehicle-start switch 50 is provided whose changeover can be manipulated by the driver, and the control for escaping from the stuck state is performed irrespective of the accelerator-pedal manipulation of driver when the automatic vehicle-start switch 50 is in ON status. FIGS. 5A and 5B are views showing a scene where the vehicle 43 escapes from its stuck state. FIG. 5A is a schematic view showing the stuck vehicle 43. FIG. 5B is time charts of the automatic vehicle-start switch 50, the driving torque, the braking torque and the road-wheel speed. At a time point t11, the driver turns the automatic vehicle-start switch 50 to the ON position. At this time, the braking torque is increased. Then, at a time point t12, the driving torque is increased. Since the wheel speed is not generated (increased), the braking torque is reduced at a time point t13. Then, at a time point t14, the braking torque is increased because the speed of drive wheel becomes higher than 2 [km/h]. At a time point t15, the braking torque is reduced because the drive-wheel speed becomes lower than 1 [km/h]. At a time point t16, the braking torque is increased because the drive-wheel speed becomes higher than 2 [km/h]. At a time point t17, it is determined that the vehicle 43 has escaped from the stuck state and has run a predetermined distance. Hence, at this time, the driving torque and the braking torque are set gradually to 0.

Thus, the braking torque is gradually reduced after a condition where a sufficient level of the driving torque can be generated has been satisfied. Therefore, the drive wheel(s) is rotated slowly while suppressing an initial slip of the drive wheel. Thereby, the drive wheel can escape from (get out of) the gap. Accordingly, the vehicle 43 can easily escape from the stuck state.

Moreover, as another example in the first embodiment, the braking-torque request value may be made equal to the predetermined value and the driving-torque request value is made equal to 0 when the driven wheel has rotated more than or equal to a predetermined number of rotations, i.e., when the vehicle 43 has escaped from the stuck state, as mentioned above. Accordingly, the vehicle can be stopped when the vehicle has escaped from the stuck state.

[Advantageous Effects]

(1) According to the first embodiment, the vehicle control apparatus includes the automatic vehicle-start switch (bad-road control-mode switch) 50 which can be manipulated by a driver, and a bad-road control section (42, 46, 47) which performs the automatic vehicle-start control (bad-road control) when the automatic vehicle-start control (bad-road control mode) is selected by the automatic vehicle-start switch 50. The bad-road control section (42, 46, 47) includes a braking-force applying section (42, 30, W/C) which applies braking force to the drive wheel, and a driving-force applying section (46, 47, 48, 49) which applies driving force to the drive wheel which is receiving the braking force, as the automatic vehicle-start control. Accordingly, the braking torque is gradually reduced after the condition where a sufficient level of driving torque can be generated has been satisfied. Therefore, the drive wheel is rotated slowly while suppressing an initial slip of the drive wheel. Thereby, the drive wheel can escape from (get out of) the gap. Hence, the vehicle 43 can easily escape from the stuck state.

(2) According to the first embodiment, the bad-road control section (42, 46, 47) further includes a rotation-number detecting section which detects that the driven wheel has rotated more than or equal to the predetermined number of rotations. Thereby, when the driven wheel has rotated more than or equal to the predetermined number of rotations; the driving-force applying section (46, 47, 48, 49) causes the driving force applied to the drive wheel to become equal to 0, and the braking-force applying section (42, 30, W/C) applies a predetermined braking force to the drive wheel. Accordingly, the movement of vehicle can be stopped when the vehicle has escaped from the stuck state.

[Second Embodiment]

In a second embodiment according to the present invention, the automatic escape control process is different from that in the first embodiment.

[Automatic Escape Control Process]

Figure 6:
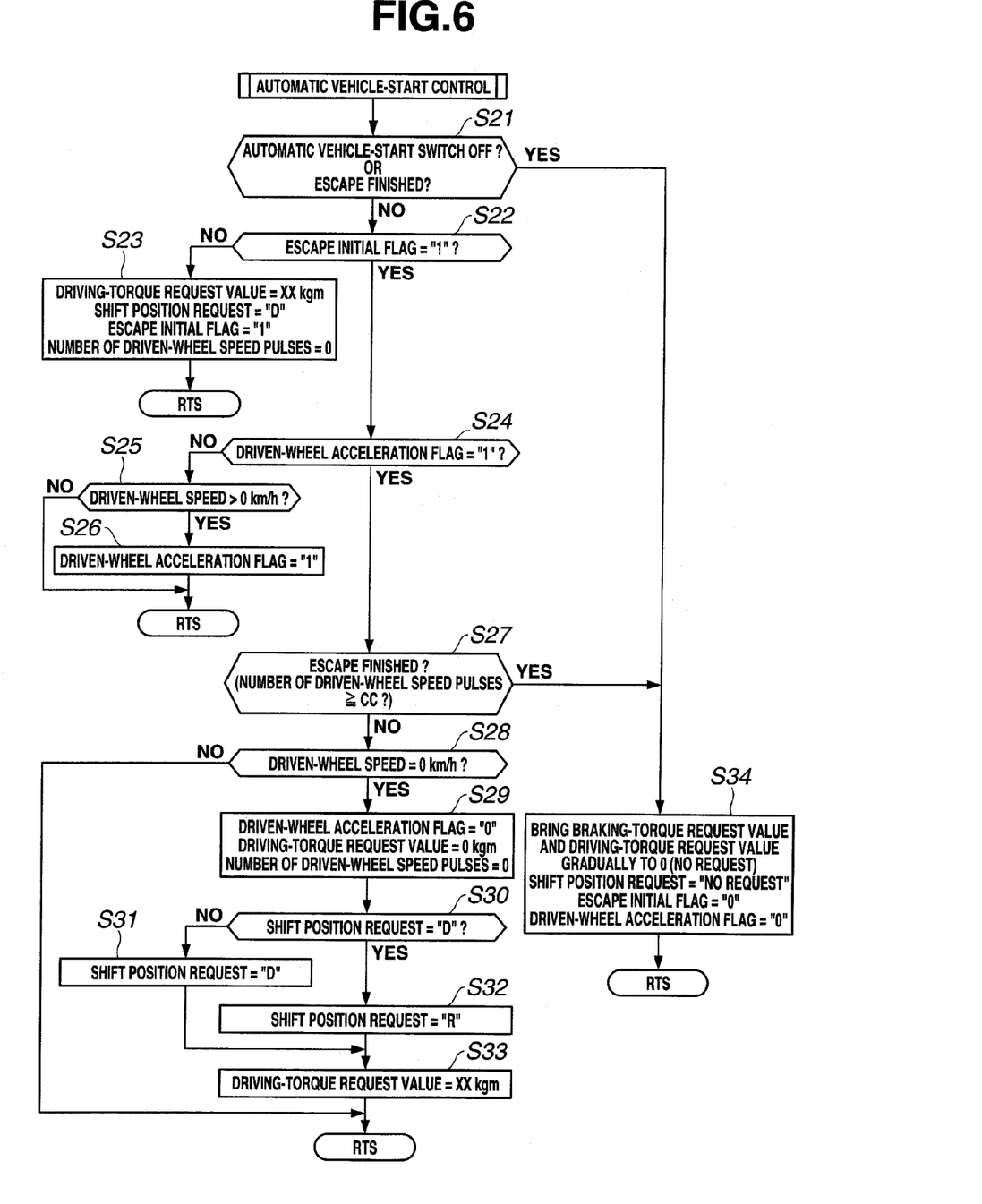
FIG. 6 is a flowchart showing a processing flow of automatic escape control in a second embodiment according to the present invention.

FIG. 6 is a flowchart showing a processing flow of automatic escape control which is performed by the brake controller 42, the engine controller 46 and the motor controller 47. At step S21, the controller judges whether or not the automatic vehicle-start switch 50 is in OFF status. Moreover, at step S21, the controller judges whether or not the escape of vehicle has ended. If at least one of these two judgments is YES at step S21, namely if the automatic vehicle-start switch 50 is in OFF status or the escape of vehicle has ended; the program proceeds to step S34. If both of these two judgments are NO at step S21, namely if the automatic vehicle-start switch 50 is in ON status and the escape of vehicle has not yet ended; the program proceeds to step S22. At step S22, the controller judges whether or not an escape initial flag is in "1" status. If NO at step S22, namely if the escape initial flag is not in "1" status; the program proceeds to step S23. If YES at step S22, namely if the escape initial flag is in "1" status; the program proceeds to step S24. At step S23, the controller sets the driving-torque request value at XX [kgm], sets a shift position request at D-range (Drive-position), sets the escape initial flag to "1" status, and sets the number of driven-wheel speed pulses at 0. Then, the program returns to step S21. At step S24, the controller judges whether or not a driven-wheel acceleration flag is in "1" status. If NO at step S24, namely if the driven-wheel acceleration flag is not in "1" status, the program proceeds to step S25. If YES at step S24, namely if the driven-wheel acceleration flag is in "1" status, the program proceeds to step S27. At step S25, the controller judges whether or not the speed of driven wheel(s) is higher than 0 [km/h]. If YES at step S25, namely if the driven-wheel speed is higher than 0 [km/h]; the program proceeds to step S26. If NO at step S25, namely if the driven-wheel speed is lower than or equal to 0 [km/h]; the program returns to step S21. At step S26, the controller sets the driven-wheel acceleration flag to "1" status, and then, the program returns to step S21.

At step S27, the controller judges whether or not the escape of vehicle has ended. If YES at step S27, namely if the escape has already ended; the program proceeds to step S34. If NO at step S27, namely if the escape has not ended; the program proceeds to step S28. The controller can judge whether or not the escape has ended, by judging whether or not the number of driven-wheel speed pulses is larger than or equal to the predetermined value CC. This predetermined value CC means that the wheel 40 has moved approximately 1 [m]. At step S28, the controller judges whether or not the driven-wheel speed is equal to 0 [km/h]. If YES at step S28, namely if the driven-wheel speed is equal to 0 [km/h]; the program proceeds to step S29. If NO at step S28, namely if the driven-wheel speed is not equal to 0 [km/h]; the program returns to step S21. At step S29, the controller clears the driven-wheel acceleration flag (i.e., resets the driven-wheel acceleration flag to "0" status), sets the driving-torque request value at 0 [kgm], and clears (resets) the number driven-wheel speed pulses. Then, the program proceeds to step S30. At step S30, the controller judges whether or not the shift position request is D-range (Drive-position). If NO at step S30, namely if the shift position request is not D-range; the program proceeds to step S31. If YES at step S30, namely if the shift position request is the D-range; the program proceeds to step S32. At step S31, the controller sets the shift position request at D-range (Drive-position), and then, the program proceeds to step S33. At step S32, the controller sets the shift position request at R-range (Reverse-position), and then, the program proceeds to step S33. At step S33, the controller sets the driving-torque request value at XX [kgm], and then, the program proceeds to step S21. At step S34, the controller sets the braking-torque request value so as to bring the braking-torque request value gradually to 0 [Mpa]. At the same time, the controller sets the driving-torque request value so as to bring the driving-torque request value gradually to 0 [kgm]. Moreover, at step S34, the controller sets the shift position request at NO-request. Furthermore, at step S34, the controller resets (clears) the escape initial flag and the driven-wheel acceleration flag. After the processing of this step S34, the program returns to step S21.

[Operations]

Figure 7A:
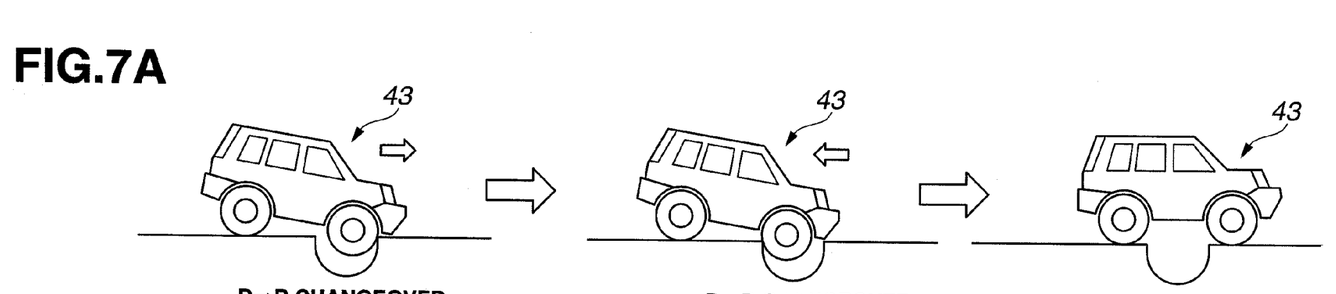
FIG. 7A is a schematic view showing appearances when the stuck vehicle escapes from the stuck state.
Figure 7B:
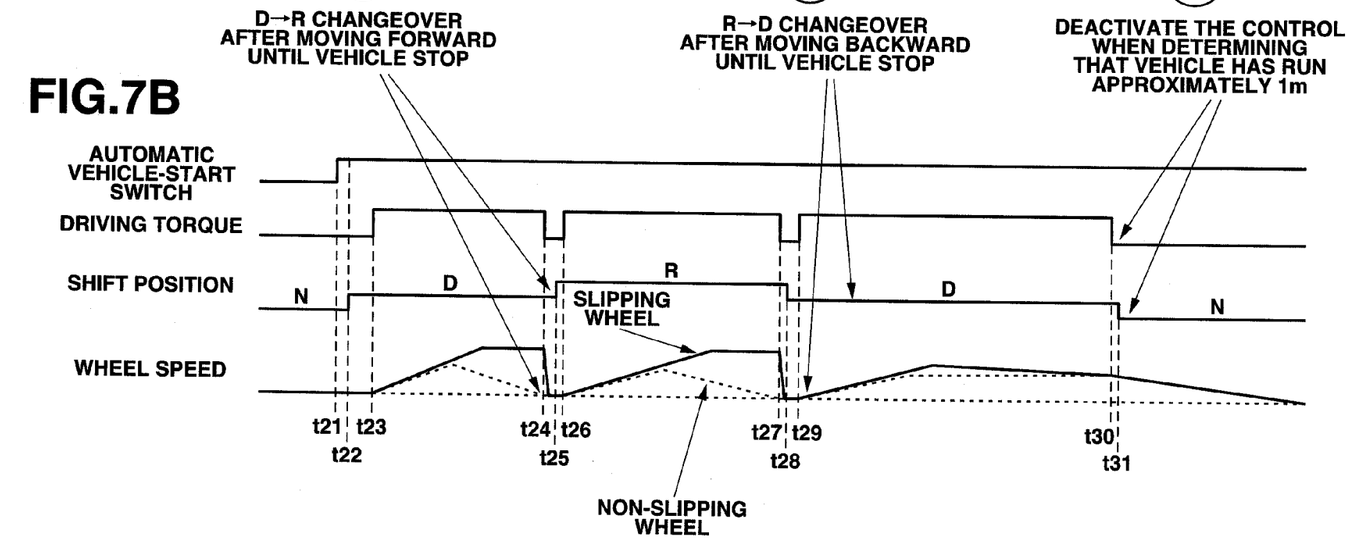
FIG. 7B is time charts of the automatic vehicle-start switch, the driving torque, a shift position and the wheel speed.

FIGS. 7A and 7B are views showing a scene where the vehicle 43 escapes from its stuck state. FIG. 7A is a schematic view showing appearances when the stuck vehicle 43 escapes from the stuck state. FIG. 7B is time charts of the automatic vehicle-start switch 50, the driving torque, the shift position and the road-wheel speed. At a time point t21, the driver turns the automatic vehicle-start switch 50 to the ON position. At a time point t22, the shift position is set at D-range (Drive-position). At a time point t23, the driving torque is increased. When the driving torque is increased, the speed of driven wheel is generated (increased from 0) because the drive wheel climbs a side surface of the gap. When it becomes difficult for the drive wheel to continue to climb the gap, the speed of driven wheel becomes equal to 0 (at a time point t24). At this time, the driving torque is reduced down to 0. At a time point t25, the shift position is set at R-range (Reverse-position). At a time point t26, the driving torque is increased. When the driving torque is increased, the speed of driven wheel is also generated (i.e., an absolute value of driven-wheel speed is increased from 0 in another direction) because the drive wheel climbs a side surface of the gap. When it becomes difficult for the drive wheel to continue to climb the gap, the speed of driven wheel becomes equal to 0 (at a time point t27). At this time, the driving torque is reduced down to 0. At a time point t28, the shift position is set at D-range (Drive-position). At a time point t29, the driving torque is increased. At a time point t30, it is determined that the vehicle 43 has escaped from the stuck state and has run a distance about equal to 1 [m]. Thereby, the driving torque is set at 0. At a time point t31, the shift position is set at N-range (Neutral-position).

Thus, a swinging (swaying) action of the drive wheel(s) is repeated in the gap in the front-rear direction. Thereby, a height by which the drive wheel can climb the gap becomes higher as the swinging action of drive wheel is repeated more times. In due course, the drive wheel becomes able to escape from the gap. Accordingly, the vehicle 43 can easily escape from the stuck state.

[Advantageous Effects]

(3) According to the second embodiment, the vehicle control apparatus includes the automatic vehicle-start switch (bad-road control-mode switch) 50 which can be manipulated by a driver, and the bad-road control section (42, 46, 47) which performs the automatic vehicle-start control (bad-road control) when the automatic vehicle-start control (bad-road control mode) is selected by the automatic vehicle-start switch 50. The bad-road control section (42, 46, 47) includes a shift changeover function which automatically changes the shift state of vehicle 43 between the forward running and the reverse running, and the driving-force applying section (46, 47, 48, 49) which reduces the driving force acting on the road-wheel 40 when the shift state of vehicle is changed by the shift changeover function and which applies a predetermined driving force to the road-wheel 40 when a predetermined time has elapsed after the change of shift state, as the automatic vehicle-start control. Accordingly, the swinging action of drive wheel is repeated in the gap in the front and rear directions. Thereby, a height by which the drive wheel can climb the gap becomes higher as the swinging action of drive wheel is repeated more times. Sooner or later, the drive wheel becomes able to escape from the gap. Therefore, the vehicle 43 can easily escape from the stuck state.

[Other Embodiments]

Although the present invention has been described above with reference to the first and second embodiments of the present invention, the present invention is not limited to the embodiments described above. Modifications and variations of the embodiments described above will occur to those skilled in the art in light of the above teachings and will be included in a scope of the present invention.

For example, the judgment about whether or not the escape of vehicle has ended is conducted by using the number of driven-wheel speed pulses in the first and second embodiments. However, according to the present invention, this judgment may be conducted by using an integral of the wheel speed. Moreover, for example, the engine and the motor are used as drive sources in the first and second embodiments. However, according to the present invention, only either one of the engine and the motor may be used as the drive source.

This application is based on prior Japanese Patent Application No. 2009-215499 filed on Sep. 17, 2009. The entire contents of this Japanese Patent Application are hereby incorporated by reference.

The scope of the present invention is defined with reference to the following claims.

What is claimed is:

1. A vehicle control apparatus comprising:
   a bad-road control-mode switch configured to be manipulated by a driver; and
   a bad-road control section configured to perform a bad-road control when a bad-road control mode is selected by the bad-road control-mode switch, the bad-road control section including:
   a braking-force applying section configured to apply a braking force to a drive-wheel, and
   a driving-force applying section configured to apply a driving force to the drive-wheel which is receiving the braking force from the braking-force applying section, as the bad-road control, wherein the driving-force applying section is configured to apply the driving force after the braking-force applying section started to apply the braking force.

2. The vehicle control apparatus as claimed in claim 1, wherein
   the bad-road control section further includes a rotation-number detecting section configured to detect that a driven-wheel has rotated more than or equal to a predetermined number of rotations;
   the driving-force applying section is configured to cause the driving force applied to the drive-wheel to become equal to 0 when the driven-wheel has rotated more than or equal to the predetermined number of rotations; and
   the braking-force applying section is configured to apply a predetermined braking force to the drive-wheel when the driven-wheel has rotated more than or equal to the predetermined number of rotations.

3. The vehicle control apparatus as claimed in claim 1, wherein
   the bad-road control section further includes a rotation-number detecting section configured to detect that a driven-wheel has rotated more than or equal to a predetermined number of rotations; and the bad-road control section is configured to finish the bad-road control when detecting that the driven-wheel has rotated more than or equal to the predetermined number of rotations.

4. The vehicle control apparatus as claimed in claim 1, wherein the bad-road control section further includes a wheel-speed detecting section configured to detect a rotational speed of the drive-wheel; and the braking-force applying section is configured to increase the braking force by a predetermined amount when the detected drive-wheel speed is higher than a first predetermined wheel speed.

5. The vehicle control apparatus as claimed in claim 4, wherein the braking-force applying section is configured to reduce the braking force by a predetermined amount when the detected drive-wheel speed is lower than a second predetermined wheel speed, and the second predetermined wheel speed is lower than the first predetermined wheel speed.

6. The vehicle control apparatus as claimed in claim 1, wherein the vehicle control apparatus comprises a brake controller configured to automatically generate the braking force, and an engine controller configured to automatically control the driving force.

\* \* \* \* \*